Patented Dec. 9, 1947

2,432,287

UNITED STATES PATENT OFFICE 2,432,287

PREPARATION OF OXO CARBONYL COMPOUNDS

Richard D. Cramer, Wilmington, Del., assignor to E. I. du Pont de Nemours & Company, Wilmington, Del., a corporation of Delaware No Drawing. Application February 9, 1943, Serial No. 475,279

9 Claims. (Cl. 260—597)

1

This invention relates to processes and products, and more specifically to a process for reacting ketaldones with polymerizable hydrocarbons containing a single olefinic unsaturation, and the products therefrom.

In copending application Serial No. 438,466, filed April 10, 1942, a novel chemical reaction has been disclosed. The reaction has been called "telomerization" (from Greek telos, meaning "end" plus Greek mer meaning "part"). "Telomerization" is defined as the process of reacting, under polymerization conditions, a molecule YZ which is called a "telogen" with more than one unit of a polymerizable compound having ethylenic unsaturation called a "taxogen" to form products called "telomers" having the formula $Y(A)_nZ$ wherein $(A)_n$ is a divalent radical formed by chemical union, with formation of new carbon bonds, of $n$ molecules of the taxogen, the unit A being called a "taxomon," $n$ being any integer greater than one, and Y and Z being fragments of the telogen attached to the terminal taxomons.

Aldehydes and ketones are generally prepared by the dehydrogenation of alcohols, the reduction of carboxylic acids or their derivatives, or by reactions applicable to only one member of the family. While these methods are usually satisfactory, they are not applicable in many cases because the starting material for the preparation of a given ketone or aldehyde or mixture of ketones or of aldehydes is not available or cannot, by reason of its physical properties, be used. Under other circumstances the methods are impractical because of the cost of the starting materials. The present invention describes how these difficulties have been overcome.

This invention has as an object the provision of new chemical compounds, especially new products containing a carbonyl radical in an end group. Another object is to provide new long chain ketaldones. A further object is to discover a new process for making ketaldones. Other objects will appear hereinafter.

These objects have been accomplished by the discovery that polymerizable aliphatic monoolefinic hydrocarbons can be combined with saturated aldehydes and ketones having at least one alpha hydrogen atom, in the presence of a suitable catalyst, to produce liquid and solid products containing the components of a plurality of molecules of the hydrocarbon and the components of one molecule of the aldehyde or ketone. These products are saturated ketaldones. Preferably the catalyst is a peroxide catalyst.

By "saturated ketaldone" is meant a ketone or

2 aldehyde which is free from carbon to carbon unsaturation, i. e., an oxo compound which is free from carbon to carbon unsaturation.

The "polymerizable, aliphatic monoolefinic hydrocarbon" employed in the process of this invention are aliphatic hydrocarbons containing a single, and that ethylenic, unsaturation which are capable of undergoing self-polymerization in the presence of peroxide catalysts. This includes such materials as ethylene, propylene, isobutylene, and the like.

By "peroxide polymerization catalyst" is meant any compound which contains the structural linkage —O—O— and which is capable of inducing polymerizations. This includes hydrogen peroxide, sodium peroxide, barium peroxide, the persulfates, the percarbonates, the perborates, and the organic diacyl and dialkyl peroxides.

In the preferred mode of operation of this invention, the polymerizable monoolefin and the ketaldone are heated together under pressure in the presence of a peroxide polymerization catalyst.

The following general procedure illustrates one manner of carrying out the practice of this invention which may be operated batchwise, semi-continuously or continuously.

A pressure-resistant reaction vessel is charged with a reaction medium, a ketaldone and the catalyst. If the polymerizable hydrocarbon is a liquid, it may also be added at this time. The reactor is then closed and evacuated to remove air. If the polymerizable hydrocarbon is a gas, it is most conveniently added after evacuation. The reaction vessel, which is capable of being heated, is placed in a shaker machine, fitted with recording and controlling thermocouples, and heating and agitation are started. If the polymerizable hydrocarbon is gas, the reaction, which starts upon reaching the reaction temperature, may be followed by the pressure drop and the pressure can be maintained by the admission of more of the olefin. When the reaction is complete, as evidenced by lack of further pressure drop, the vessel is cooled, bled of excess reactants, opened, and the contents discharged. The products are isolated by steam distillation of solvents, volatile products, and/or unused reactant followed by fractional distillation of the steam distillate and filtration and drying the non-volatile portion of the product. The latter may be further purified by distillation under reduced pressure or fractional crystallization.

The following examples illustrate the practice of this invention. Parts are given by weight unless otherwise specified.

*Example I*

A silver-lined reaction vessel is charged with 100 parts of water, 50 parts of freshly distilled paraldehyde and 0.5 part of benzoyl peroxide. The pH of the aqueous phase is adjusted to 2.3 with dilute hydrochloric acid (to convert the paraldehyde to acetaldehyde) and the vessel is closed, evacuated, and ethylene is admitted to a pressure of 500 atmospheres. The vessel is placed in a shaker machine and the necessary connections to thermocouples and pressure recording devices are made. During a reaction time of 9.5 hours, throughout which the temperature is maintained at 98° to 101° C. and the pressure at 865 to 955 atmospheres, the total observed pressure drop is 110 atmospheres. The pressure is maintained in the designated range during the reaction by introducing additional ethylene into the vessel. After reaction, the vessel is cooled, bled of excess gas, opened, and the reaction mixture discharged. The polymer is isolated by steam distillation, filtration, and drying. There is obtained 66 parts of a white solid. It melts at 111° to 113° C. and has an ethylene/acetaldehyde ratio of 27.6. It contains carbonyl groups but no hydroxyl groups as is evidenced by infra-red absorption spectra studies. It is colored yellow by and imparts a yellow color to concentrated sulfuric acid. It is soluble in kerosene, toluene, and pyridine but insoluble in ether, ethanol, acetic acid, propyl acetate, and chloroform.

The ethylene/ketaldone ratios of these polymers are calculated by setting the quotient obtained by dividing the sum of the weight of carbon in one mole of the ketaldone and $x$ moles of ethylene by the sum of the weight of one mole of the ketaldone and $x$ moles of ethylene equal to 1/100 of the percentage of carbon contained in the polymer as determined by microanalysis, and solving the resulting equation for $x$.

*Example II*

A stainless steel-lined reaction vessel is charged with 100 parts of water, 50 parts of freshly distilled paraldehyde, and 0.5 part of benzoyl peroxide. The pH of the aqueous phase is adjusted to 2.5 by the addition of dilute hydrochloric acid solution and the vessel is closed, evacuated, ethylene is introduced under pressure, etc. as described in Example I. During a reaction time of 17.25 hours, throughout which the temperature is maintained between 104° to 125° C. and the pressure at 505 to 920 atmospheres, the total observed pressure drop is 270 atmospheres. Most of the ethylene is absorbed during the first 0.25 hour while the tube is being heated from 104° to 121° C. The pressure is maintained in the designated range during the reaction by the occasional introduction of more ethylene. The vessel is cooled, bled of excess gas, opened and the reaction mixture discharged. The product is isolated by steam distilling, filtering and drying. It amounts to 48 parts of light brown solid which melts at 110° C. and has an ethylene/acetaldehyde ratio 20.9 and a molecular weight of 530, indicating one aldehyde group per molecule. On reaction of the product with 2,4-dinitrophenylhydrazine by the method described by Shriner and Fuson in "Identification of Organic Compounds," 2nd ed. John Wiley (1940), page 143, a 2,4-dinitrophenylhydrazone is isolated.

*Example III*

A stainless steel-lined reaction vessel is charged with 100 parts of water, 50 parts of freshly distilled propionaldehyde and 0.5 part of benzoyl peroxide; the pH of the aqueous phase is 3.5. The vessel is closed, evacuated, ethylene is introduced under pressure, etc. as described in Example I. During a reaction time of 8.75 hours, throughout which the temperature is maintained at 100° to 101° C. and the pressure at 850 to 965 atmospheres, the total observed pressure drop is 455 atmospheres. The greasy product is steam distilled thus separating it into steam-volatile and non-volatile components. The non-volatile portion amounts to 20 parts of a gray grease which melts at 55° to 65° C. It has an ethylene/propionaldehyde ratio of 9.1 and a molecular weight of 410. The volatile portion amounts to 8 parts of a clear, colorless, slightly viscous liquid with a pleasant aromatic odor. It distills over the range 100° to 250° C. and gives a positive test for the aldehyde group when tested with Schiff's reagent according to the method cited in Shriner and Fuson, loc. cit., page 62.

*Example IV*

A stainless steel-lined reaction vessel is charged with 100 parts of water, 50 parts of freshly distilled acetone, and 0.5 part of benzoyl peroxide; the pH of the solution is 3.4. The vessel is closed, evacuated, ethylene is introduced under pressure, etc., as described in Example I. During a reaction time of 18.25 hours, throughout which the pressure is maintained at 450 to 950 atmospheres and the temperature at 99° to 112° C., the total observed drop in pressure is 735 atmospheres. The product, isolated by steam distilling the reaction mixture, washing and drying, amounts to 47 parts of a white powder-like solid which melts at 115° to 118° C. It has an ethylene/acetone ratio of 39 and a molecular weight of 1080. It is soluble in benzenoid hydrocarbons, dioxane, and chlorinated hydrocarbons and insoluble in ethanol and acetic acid. It reacts with 2,4-dinitrophenylhydrazine by the method of Shriner and Wiley, loc. cit., to give a 2,4-dinitrophenylhydrazone.

*Example V*

A silver-lined reaction vessel is charged with 100 parts of water, 50 parts of freshly distilled cyclohexanone, and 1 part of benzoyl peroxide. The vessel is closed, evacuated, ethylene is introduced under pressure, etc., as described in Example I. During a reaction time of 9.45 hours, throughout which the temperature is maintained at 193° to 201° C. and the pressure at 600 to 950 atmospheres, the total observed pressure drop is 1110 atmospheres. The product is isolated by steam distilling the reaction mixture, filtering off the residue and drying. There is thus obtained 60 parts of a light colored wax-like solid which has an ethylene/cyclohexanone ratio of 20 and a molecular weight of 650. It reacts with 2,4-dinitrophenylhydrazine by the method of Shriner and Wiley, loc. cit., to yield a 2,4-dinitrophenylhydrazone.

*Example VI*

A sterling silver-lined reaction vessel is charged with 25 parts of cyclohexanone, 0.5 part of diethyl peroxide, and 1 part of borax. The vessel is closed, evacuated, ethylene is introduced under pressure, etc., as described in Example I. During a reaction time of 0.25 hour, throughout which the temperature is maintained at 147° to 151° C. and the pressure at 500 to 955 atmospheres, the total observed pressure drop is 420 atmospheres. The product is isolated by steam distilling the reaction mixture, filtering off the residue and drying. There is obtained 65 parts of a white solid which has an ethylene/cyclohexanone ratio of 34 and a molecular weight of 1040. It is soluble in pyridine, dioxane, benzene and xylene; insoluble in chloroform and acetic acid; and melts at 105° to 106° C.

*Example VII*

A sterling silver-lined reaction vessel is charged with 50 parts of cyclohexanone, 0.5 part of hexachloroethane, and 2 parts of borax. The vessel is closed, evacuated, ethylene is introduced under pressure, etc., as described in Example I. During a reaction time of 10 hours the temperature is maintained at 210° to 251° C. and the pressure at 135 to 500 atmospheres. The product is recovered by dissolving the reaction mixture in benzene, filtering, and steam distilling until the benzene is completely driven off. There is obtained 14 parts of a soft, white grease which gives a clear melt at about 80° C. It has a molecular weight of 273 and is soluble in benzene, dioxane, pyridine, and xylene, very slightly soluble in chloroform, insoluble in acetic acid and phenol.

*Example VIII*

A sterling silver-lined reaction vessel is charged with 50 parts of cyclohexanone and 2 parts of ammonium persulfate. The vessel is closed, evacuated, ethylene is introduced under pressure, etc., as described in Example I. During a reaction time of 7.75 hours, throughout which the temperature is maintained at 100° to 103° C. and the pressure at 890 to 935 atmospheres, the total pressure drop is 65 atmospheres. The product is recovered by steam distilling the reaction mixture, filtering off the residue and drying. It is a yellow wax with a molecular weight of 850. It is soluble in benzene, pyridine, and xylene; insoluble in acetic acid, chloroform, dioxane, and phenol.

*Example IX*

A sterling silver-lined reaction vessel is charged with 50 parts of cyclohexanone and 0.5 part of hydrazine dihydrochloride. The vessel is closed, evacuated, ethylene is introduced under pressure, etc., as described in Example I. During a reaction time of 8.25 hours, throughout which the temperature is maintained at 200° to 202° C. and the pressure at 890 to 910 atmospheres, the total observed pressure drop is 20 atmospheres. The product is a dark brown, soft wax which fuses to a clear melt at 45° to 50° C. It has a molecular weight of 440 and is soluble in acetic acid, benzene, chloroform, dioxane, phenol, pyridine, and xylene.

*Example X*

A sterling silver-lined reaction vessel is charged with 50 parts of cyclohexanone and 1 part of hydroxylamine hydrochloride. The vessel is closed, evacuated, ethylene is introduced under pressure, etc., as described in Example I. During a reaction time of 7.25 hours, throughout which the temperature is maintained at 195° to 203° C. and the pressure at 870 to 965 atmospheres, the total observed pressure drop is 90 atmospheres. The product is a dark brown, tacky grease which fuses to a clear melt at about 70° C. and has a molecular weight of 180.

As polymerizable hydrocarbons to be used in the practice of this invention, any aliphatic hydrocarbon containing a single ethylenic unsaturation and capable of being polymerized can be employed. This includes such examples as ethylene, propylene, butene-1, butene-2, isobutylene, etc., but excludes materials like styrene, butadiene, vinylacetylene and divinylbenzene. The preferred polymerizable hydrocarbons contain from 2 to 4 carbon atoms, and preferably they contain a vinyl group ($CH_2=CH-$). Ethylene is especially preferred.

As the end forming component, i. e., the telogen, for use in the invention, any source of saturated monomeric ketaldone having at least one alpha hydrogen atom (i. e., containing the structure

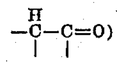

or any material which will yield such monomeric ketaldone by means of thermal or catalytic decomposition can be employed. The preferred examples are the ketaldones themselves, such as, for example, acetone, acetaldehyde, methyl phenyl ketone, cyclohexanone, butanone-2, hexanone-3, pentanone-1, octanone-1, octanone-4, etc., cyclotrimers of aldehydes, such as, for example, paraldehyde and acetals of the various ketaldones. The preferred ketaldones contain from 2 to 8 carbon atoms.

It should be emphasized that ketaldones containing at least one alpha hydrogen have properties different from those of other ketaldones. They alone can be employed as the end forming component, i. e., the telogen in the operation of this invention to yield higher ketaldones. Thus, formaldehyde reacts with ethylene to yield a product containing oxygen in the form of hydroxyl groups and/or ether linkages. Furfural and benzaldehyde do not react with the polymerizable hydrocarbon under the reaction conditions of the present invention.

The molecular weight of the products produced by this invention will vary with the amount of ketaldone furnished for reaction with the polymerizable hydrocarbon. This can be varied over wide limits, but, in order that the product consist only of products having a plurality of units corresponding to the polymerizable aliphatic monoolefinic hydrocarbon and the components of but one molecule of the saturated ketaldone (oxo carbonyl compound) having at least one alpha hydrogen atom, it is preferable to use more than one mole of ketaldone for each one hundred moles of polymerizable hydrocarbon.

The reaction of the present invention does not occur in the absence of a suitable catalyst. The catalysts used in the process of this invention are agents which are effective as catalysts for the polymerization of vinyl compounds and which agents, are at the same time, ineffective as catalysts for the Friedel-Crafts reaction. It must be specifically understood that the process of the present invention is not related to the Friedel-Crafts type reactions and that the Friedel-Crafts type catalysts, such as aluminum chloride, boron trifluoride, sulfuric acid, and hydrofluoric acid, are inoperative for the present process. While the agents used in the present reaction are commonly spoken of as catalysts, it is thought that they do not act as an inert catalyzing agent such, for example, as carbon black, but that they take part in the reaction in some way. In fact, it may be that a better term for these agents would be reaction promoters. However, since reaction promoters have been called catalysts so generally in the art, and since the mechanics of the present process are not clearly established, the term "catalyst" has been employed herein.

Both polymerization of vinyl compounds and Friedel-Crafts reactions with these same type compounds are so well known that any one skilled in the art will be able, without difficulty, to select a catalyst which would be effective to promote polymerization and ineffective to promote Friedel-Crafts reaction. By way of example, the following suitable catalysts are mentioned, hydrazine dihydrochloride, hydroxylamine dihydrochloride, the combination of hexachloroethane and borax, and peroxide compounds, the latter being preferred. The preferred examples of the peroxide catalyst are hydrogen peroxide, sodium peroxide, barium peroxide, sodium peroxydisulfate, potassium peroxydisulfate, ammonium peroxydisulfate, the percarbonates, the perborates, diacetyl peroxide, dibenzoyl peroxide, acetyl benzoyl peroxide, dipropionyl peroxide, dilauroyl peroxide, disuccinic acid peroxide, diphthalic acid peroxide, diethyl peroxide, and ascaridole, although others may be used. Organic peroxides are especially preferred, particularly dibenzoyl peroxide.

The concentration of catalyst required in the practice of this invention can vary over a wide range. For reasons of economy it is generally desirable to use low concentrations of catalyst, for example, from about 0.01% to 1%. Lower molecular weight products, which are desirable for many uses, are conveniently prepared with catalyst concentrations up to 15% or more based on the amount of polymerizable monomer.

Although it is not necessary to employ a liquid diluent in the practice of this invention, the yields are generally higher if one is used. Water is especially valuable although any relatively inert non-polymerizable, normally liquid compound is a satisfactory diluent for the reaction. Suitable diluents are water, benzene, toluene, iso-octane, cyclohexane, sec.-butanol, tert.-butanol, methyl formate, and the like.

The pH of the reaction mixture is not a critical feature of this invention so long as the mixture does not become sufficiently acid or basic to cause the ketaldone to condense with itself. For this reason it is preferable to operate the reaction in a pH range of 2 to 9, but this is not a necessary condition.

Although the purity of the reactants used in the operation of this invention is not a critical feature, it is preferable to use reagents as pure as is commercially feasible. Ketaldones of ordinary commercial grade are usually satisfactory. The unsaturated hydrocarbons are purified batchwise or continuously and then stored until ready for use. Oxygen is one of the most objectionable impurities. It is preferred to operate the invention in the absence of a substantial amount of molecular oxygen, in order to obtain the highest yields and molecular weights of products, but its absolute removal is troublesome and expensive. Hydrocarbons containing 200 or more parts per million of oxygen can be used, but preferably hydrocarbons containing less than 20 parts per million are employed.

The matter of oxygen removal is further advanced by employing oxygen-free diluents and flushing the reaction vessels with nitrogen immediately before charging. In addition, the reactors are evacuated before the gaseous reactants are added. While these precautions are not absolutely essential, they have been found to produce the best results, and their use is preferred.

The invention can be operated over a wide range of temperature, for example, from 25° to 350° C. It is not usually desirable to use the highest temperatures since the yields are adversely affected and because the ketaldones may be comparatively unstable at elevated temperatures. On this account it is generally desirable to maintain the reaction temperature below 300° C. As a rule, however, reaction at 25° C. is rather slow, so that the preferred range extends from about 50° to 300° C. The choice of the temperature employed for the operation of this invention depends primarily upon the catalyst used, for example, diacyl peroxides and persulfates generally operate best in a temperature range from 50° to 150° C. Diethyl peroxide is preferably employed in a temperature range of 100° to 200° C. Hexachloroethane and hydrazine compounds generally require even higher temperatures, e. g., from 130° to 250° C.

The reaction vessels used in the operation of this invention should be capable of withstanding the pressures ordinarily used in conducting the reactions or developed during the reaction. In addition, it has been found that these should be manufactured of or lined with certain corrosion-resistant materials. The preferred examples of these are silver, sterling silver, stainless steel, aluminum, glass, porcelain, and enamel.

The molecular weight of the products is a function of the pressure used in their preparation. Any pressure above atmospheric may be used, but it is generally preferred to operate, especially with ethylene, in the range of from 20 atmospheres to 1500 atmospheres.

The group of new products made by this process are ketaldones having the formula $$Y(A)_nZ$$

wherein $(A)_n$ is a divalent radical formed by condensation of a polymerizable aliphatic mono-olefinic hydrocarbon, $n$ is an integer greater than 2, and Y and Z are fragments of a ketaldone YZ of from 2 to 8 carbon atoms. Those made using ethylene as the component contributing a plurality of molecules to the product are especially preferred.

The products obtained in the practice of this invention are new compositions of matter and some, being of moderately high molecular weight, are of value by reason of their physical properties, for example, they may be employed as synthetic waxes. Since all are ketaldones, i. e., oxo carbonyl compounds, they may be used synthetically, for example, by reaction with hydroxylamine followed by catalytic reduction, organic bases may be prepared; carboxylic acids may be prepared by oxidation; reduction leads to alcohols.

The term oxo carbonyl compound denotes a compound having a carbonyl (C=O) bonded to hydrogen and/or carbon and is a term generic to ketones and aldehydes.

It is apparent that many widely different embodiments of this invention may be made without departing from the spirit and scope thereof, and, therefore, it is not intended to be limited except as indicated in the appended claims.

1. Process for preparing, from a saturated mono-oxo carbonyl compound having at least one alpha hydrogen atom, a greasy to solid mixture of oxo carbonyl compounds of higher molecular weight and increased carbon and hydrogen content, which comprises subjecting ethylene and at least one mol, per hundred mols of ethylene, of said oxo carbonyl compound at a temperature between 50° C. and 300° C. and at an ethylene pressure of between 20 and 1500 atmospheres to the action of benzoyl peroxide in the presence of water and the absence of any substantial amount of molecular oxygen and isolating the greasy to solid product obtained.

2. A greasy to solid mixture of oxo-carbonyl compounds having a hydrocarbon chain $$—(CH_2—CH_2)_n$$

wherein $n$ is an integer and at least 9, the remainder of the molecule consisting of the atoms of a saturated mono-oxo-carbonyl compound of from two to eight carbon atoms having at least one alpha hydrogen atom, said mixture being obtained by the process of claim 1.

3. Process for preparing a greasy to solid mixture of oxo carbonyl compounds which comprises subjecting ethylene and at least one mol, per hundred mols of ethylene, of cyclohexanone to the action of a peroxygen compound as a polymerization catalyst at 25–350° C. and an ethylene pressure of 20–1500 atmospheres.

4. A waxy mixture of oxo carbonyl compounds having a molecular weight in the range of 650–1040 containing a hydrocarbon chain $$—(CH_2CH_2)_n—$$

wherein $n$ has a value in the range 20–34, the remainder of the molecule consisting of the atoms of one molecule of cyclohexanone and $n$ has a value in the range 20–34 said waxy mixture being obtained by the process of claim 3.

5. Process for preparing a greasy to solid mixture of oxo carbonyl compounds having in their molecules the carbons of a plurality of ethylene molecules and the carbons of one molecule of a saturated mono-oxo carbonyl compound having at least one alpha hydrogen atom which comprises subjecting ethylene and at least one mol, per hundred mols of ethylene, of said oxo carbonyl compound at a temperature of 25–350° C. and an ethylene pressure of 20–1500 atmospheres in the presence of water and in the absence of a substantial amount of molecular oxygen to the action of a peroxygen compound as a polymerization catalyst and isolating the greasy to solid product obtained.

6. Process for preparing a greasy to solid mixture of oxo carbonyl compounds having in their molecules the carbons of a plurality of ethylene molecules and the carbons of one molecule of a saturated mono-oxo carbonyl compound having at least one alpha hydrogen atom which comprises subjecting ethylene and at least one mol, per hundred mols of ethylene, of said oxo carbonyl compound at a temperature of 25–350° C. and an ethylene pressure of 20–1500 atmospheres in the presence of water and in the absence of a substantial amount of molecular oxygen to the action of a peroxygen compound as a polymerization catalyst and isolating the greasy to solid product obtained.

7. A greasy to solid mixture of oxo carbonyl compounds having a polyethylene chain $$(—CH_2—CH_2—)_n$$

wherein $n$ is an integer and at least 9, the remainder of the molecule consisting of the atoms of a saturated mono-oxo carbonyl compound having at least one alpha hydrogen atom, said mixture being obtained by the process of claim 5.

8. Process for preparing a greasy to solid mixture of oxo carbonylic compounds having a chain $—(CH_2CH_2)_n$ where $n$ is an integer and at least 9, the remainder of the molecule consisting of the atoms of a ketone having two to eight carbons and having an alpha hydrogen which comprises subjecting a mixture of ethylene and at least one mol, per hundred mols of ethylene, of said ketone at 25–300° C. and an ethylene pressure of 20–1500 atmospheres in the presence of water and the absence of any substantial amount of molecular oxygen to the action of a peroxygen compound as a polymerization catalyst and isolating the greasy to solid product obtained.

9. A greasy to solid mixture of oxo carbonylic compounds having a chain $—(CH_2CH_2)_n—$ where $n$ is an integer and at least 9, the remainder of the molecule consisting of the atoms of a ketone having two to eight carbons and having at least one alpha hydrogen atom, said mixture being obtained by the process of claim 8.

RICHARD D. CRAMER.

REFERENCES CITED

The following references are of record in the file of this patent:

UNITED STATES PATENTS

| Number | Name | Date |
|---|---|---|
| 2,253,525 | Loder | Aug. 26, 1941 |
| 1,757,830 | Brown | May 6, 1930 |
| 2,308,192 | Mikeska | Jan. 12, 1943 |
| 1,963,108 | Werntz | June 19, 1934 |

OTHER REFERENCES

Blaise et al., "Compte Rendus," vol. 148, p. 491 (1909).

Kipping et al., "Jour. Chem. Soc." (London), vol. 57, p. 32 (1890).